(12) United States Patent
Kazban

(10) Patent No.: US 11,622,536 B2
(45) Date of Patent: Apr. 11, 2023

(54) PET NAIL CAPS

(71) Applicant: Roman V Kazban, Washington, DC (US)

(72) Inventor: Roman V Kazban, Washington, DC (US)

( * ) Notice: Subject to any disclaimer, the term of this patent is extended or adjusted under 35 U.S.C. 154(b) by 0 days.

(21) Appl. No.: 17/214,863

(22) Filed: Mar. 28, 2021

(65) Prior Publication Data

US 2022/0304277 A1    Sep. 29, 2022

(51) Int. Cl.
*A01K 13/00* (2006.01)
*F16B 37/14* (2006.01)
*F16B 37/00* (2006.01)

(52) U.S. Cl.
CPC ............ *A01K 13/00* (2013.01); *F16B 37/002* (2013.01); *F16B 37/14* (2013.01)

(58) Field of Classification Search
CPC ...... A01K 13/00; A01K 13/006; A01K 29/00; F16B 37/002; F16B 37/14
USPC ................................ D30/146, 148; 119/851
See application file for complete search history.

(56) References Cited

U.S. PATENT DOCUMENTS

| | | | | |
|---|---|---|---|---|
| 2,028,674 A * | 1/1936 | Larson | ................ | A01K 13/006 119/851 |
| 2,704,066 A * | 3/1955 | Sanden | ................ | A01K 17/00 119/851 |
| 4,962,731 A * | 10/1990 | Wexler | ................ | A01K 13/006 132/73 |
| 6,659,047 B2 * | 12/2003 | Gat | ................ | A01K 13/007 119/851 |
| 6,786,029 B2 * | 9/2004 | Kuzuu | ................ | A01K 13/007 54/82 |
| 7,069,879 B1 * | 7/2006 | Wexler | ................ | A01K 13/006 119/851 |
| 7,703,419 B1 * | 4/2010 | Wexler | ................ | A01K 13/00 119/851 |
| 9,956,065 B2 * | 5/2018 | Flickinger | ................ | A61D 7/00 |
| 10,143,183 B2 * | 12/2018 | Snyder | ................ | A01K 13/007 |
| 10,306,869 B2 * | 6/2019 | McHenry | ................ | A01K 13/007 |
| 2013/0256162 A1 * | 10/2013 | Snyder | ................ | A01K 13/00 119/856 |
| 2017/0094940 A1 * | 4/2017 | Leombruno | ................ | A01K 13/007 |

* cited by examiner

*Primary Examiner* — William V Gilbert

(57) ABSTRACT

Pet nail caps cover pets' nails to prevent scratches on surfaces (e.g., hardwood and tiled flooring) and avoid injuries to themselves and others (e.g., pets' eyes and ears, human extremities) while not compromising pet's mobility but rather improving it. The treads on the caps' tips increase the coefficient of friction between the caps (i.e., individual pet's nails) and the hard-surface flooring improving traction and overall pet's mobility. Internal spirals allow the caps to twist onto pets' nails and stay securely attached. A rubber-like material of construction (e.g., thermoplastic elastomers, thermoplastic polyurethane) provides for cap's flexibility and durability.

3 Claims, 6 Drawing Sheets

PET NAIL CAPS

BACKGROUND OF THE INVENTION

1. The Field of Endeavor

This invention generally relates to pet accessories, and more particularly, to nail covers for domesticated animals for purposes of preventing scratches, avoiding injuries, and providing traction on hard-surface flooring for improving pet's overall mobility.

2. State of the Art

As evident by numerous commercial products currently available in the art of pets' nail covers, a need exists for preventing damages caused by pets to household goods and surfaces, and for avoiding injuries caused by pets to themselves, their owners, and others. However, because of the material of construction and designs employed, the prior art reduces the coefficient of friction between pets' nails and contact surfaces such as hard-surface flooring (e.g., hardwood or tiled flooring). This often leads to a pet slipping and sliding and may result in a fall and cause injuries. Animals, in particular dogs, when slipping and sliding, flex their paws and engage their nails to maintain their balance and prevent a fall. Reducing the coefficient of friction between pets' nails and flooring would negate their efforts in maintaining balance. In addition, older pets, and pets with neurological or musculoskeletal abnormalities often have difficulties with walking on hard-surface flooring due to its slippery nature. Providing these pets with the means to increase the coefficient of friction between their nails and flooring would increase traction and improve pets' overall mobility. Another pitfall exhibited by the prior art is the method of attaching nail covers to pets' nails. The prior art mainly employs a sliding or pulling/pushing technique to attach them to pets' nails. Often, this causes pets discomfort and even pain. Hence, a need exists for pet nail covers that would address the aforementioned problems with the prior art and would provide the means to cover pets' nails while not compromising pet's mobility but rather improving it, as well as provide a method for attaching and removing nail covers without causing pets discomfort and/or pain.

A search of the prior art did not disclose any patents that read directly on the claims of the instant invention; however, the following references were considered related: U.S. Pat. No. 10,306,869 issued in the name of McHenry, U.S. Pat. No. 10,143,183 issued in the name of Snyder, U.S. Pat. No. 9,956,065 issued in the name of Flickinger, et al., U.S. Pat. No. 7,703,419 issued in the name of Wexler, U.S. Pat. No. 7,069,879 issued in the name of Wexler, U.S. Pat. No. 6,786,029 issued in the name of Kuzuu, U.S. Pat. No. 6,659,047 issued in the name of Gat, U.S. Pat. No. 4,962,731 issued in the name of Wexler.

BRIEF SUMMARY OF THE INVENTION

The claimed invention—the pet nail cap—comprises a tubular element having an upper end with an opening, a closed lower end with one or more treads on the exterior edge, and a hollow interior with one or more spirals on the interior surface. The treads on the cap's lower end (i.e., the tip) increase the coefficient of friction between the cap (hence, an individual pet's nail) and the hard-surface flooring improving traction and overall pet mobility. The spirals on the internal surface of the cap allow it to be twisted onto the pet's nail and stay securely attached. A rubber-like material of construction such as thermoplastic elastomers provides for the cap's flexibility and durability.

DETAILED DESCRIPTION OF THE INVENTION

Figure 1:
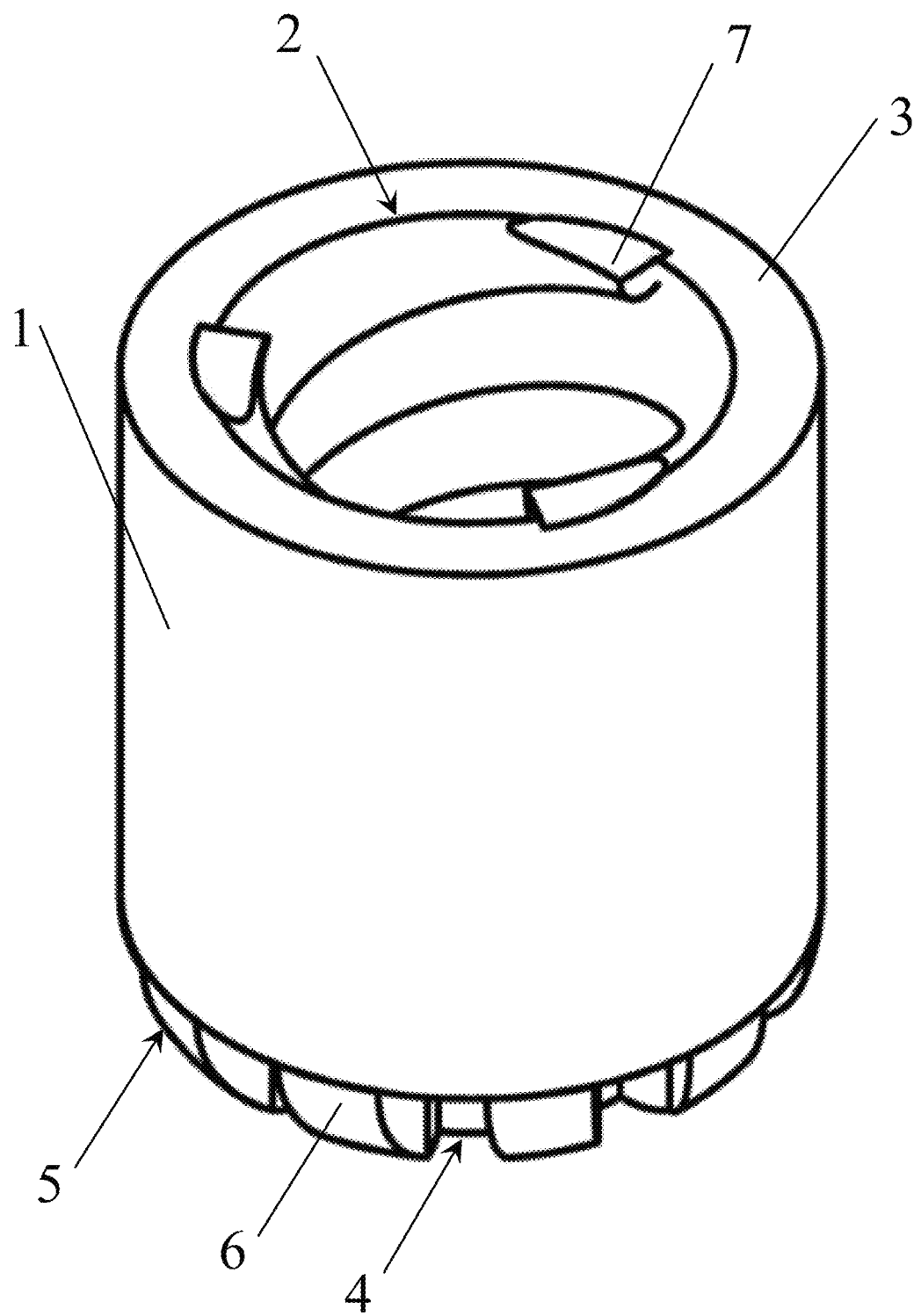
FIG. 1 is an isometric view of a pet nail cap illustrating the tubular element shaped as a hollow cylinder with internal spirals and the upper end with a circular opening.
Figure 2:
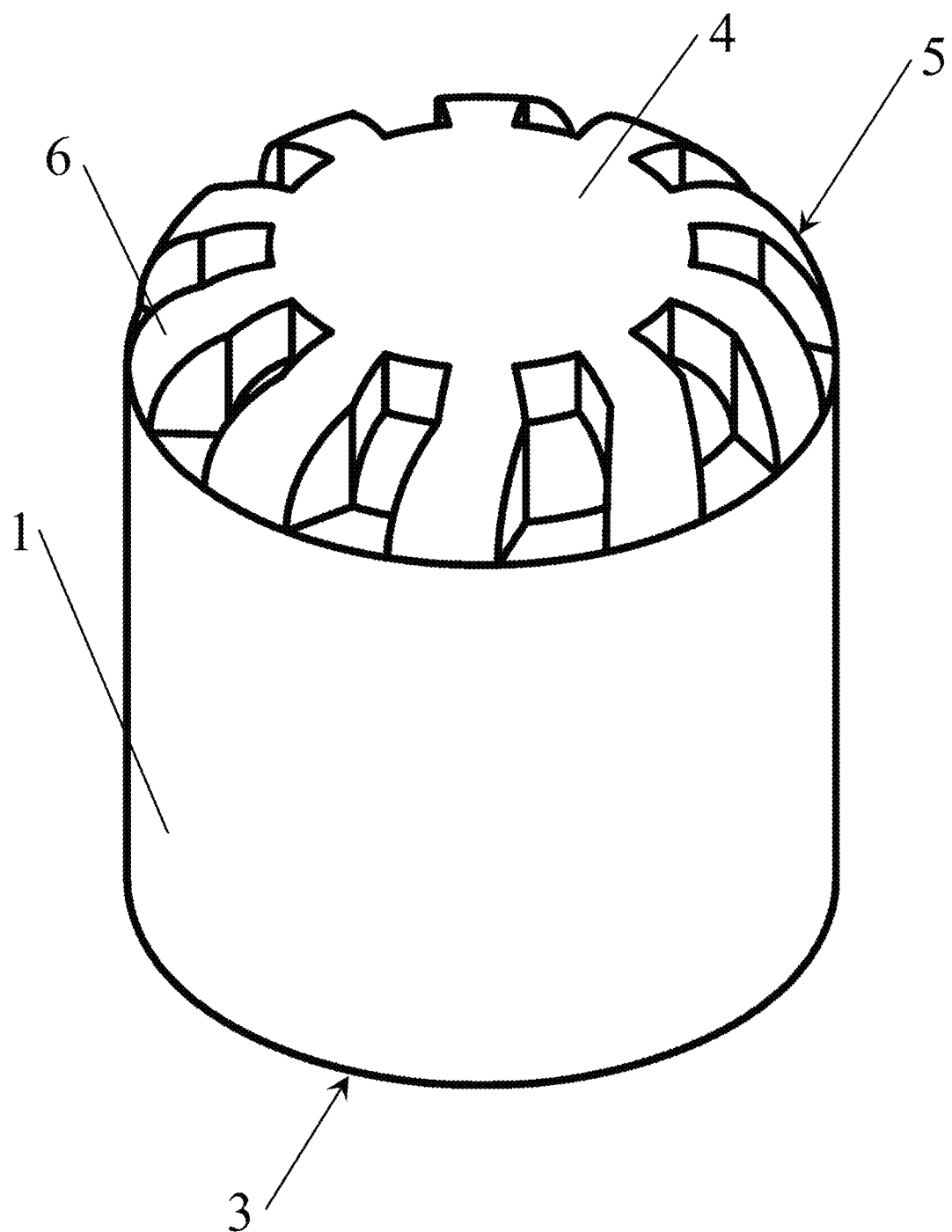
FIG. 2 is an isometric view of a pet nail cap illustrating the tubular element shaped as a hollow cylinder with internal spirals and the closed lower end with treads.
Figure 3:
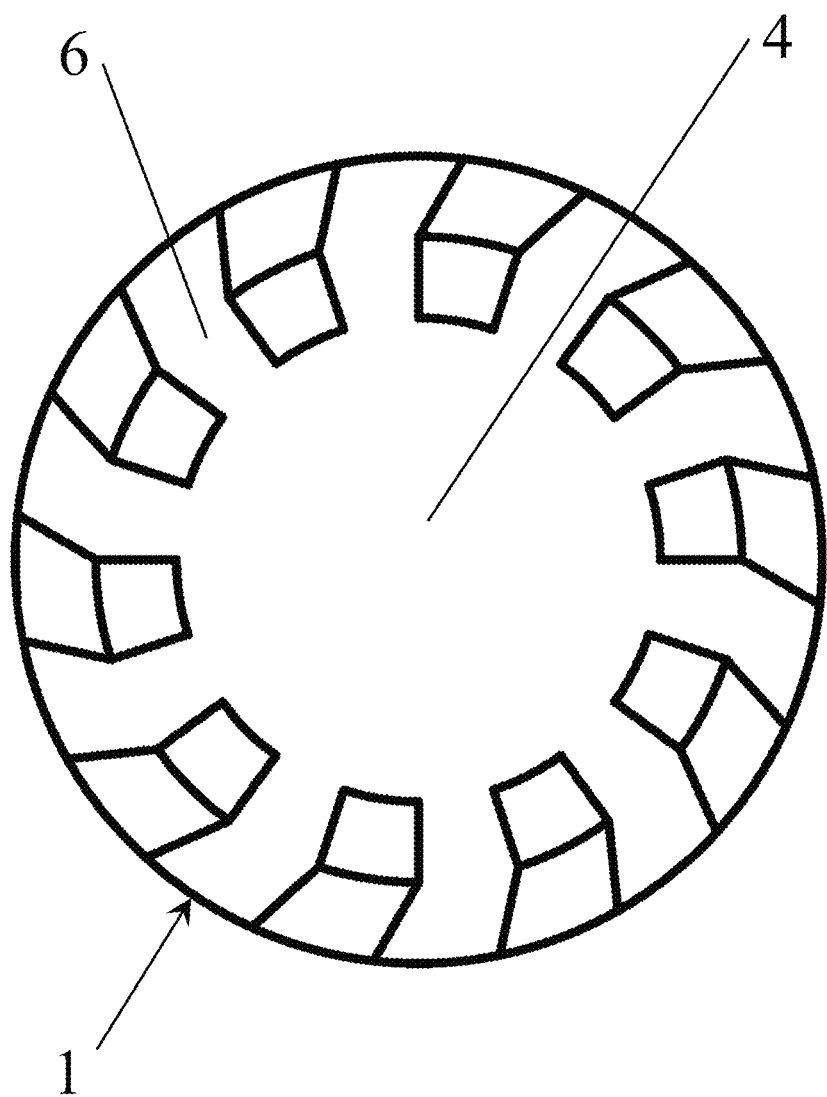
FIG. 3 is a bottom elevational view of a pet nail cap illustrating the closed lower end with treads.
Figure 4:
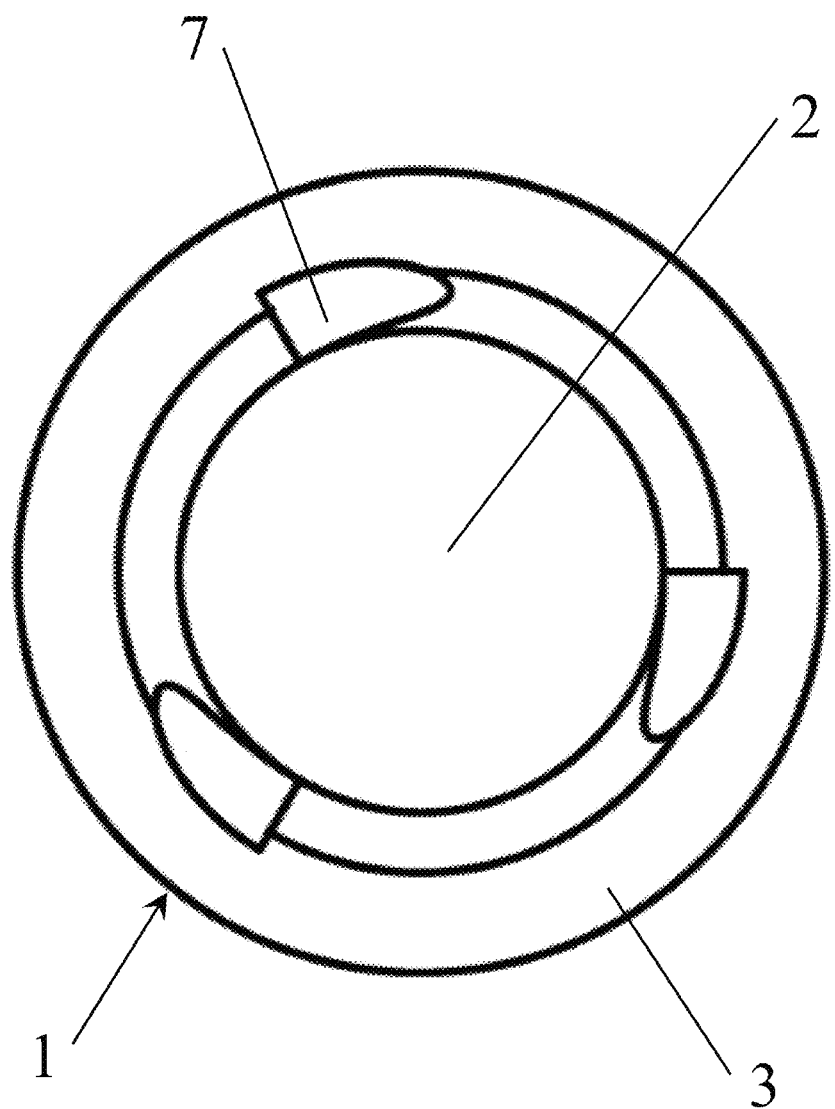
FIG. 4 is a top plan view of a pet nail cap illustrating the upper end with a circular opening and internal spirals.
Figure 5:
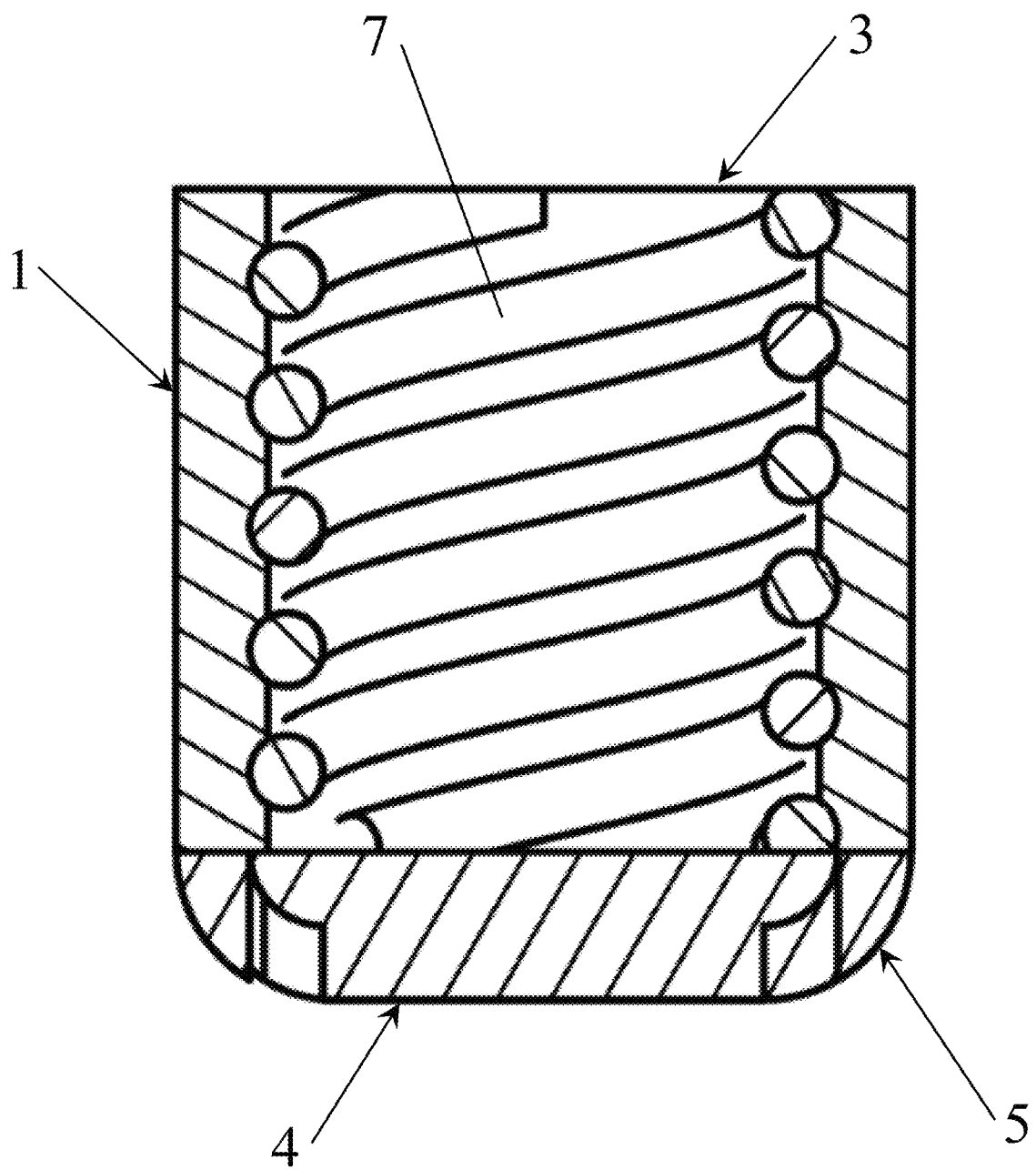
FIG. 5 is a cross-sectional view of a pet nail cap illustrating the internal spirals that span the full length of the tubular element.
Figure 6:
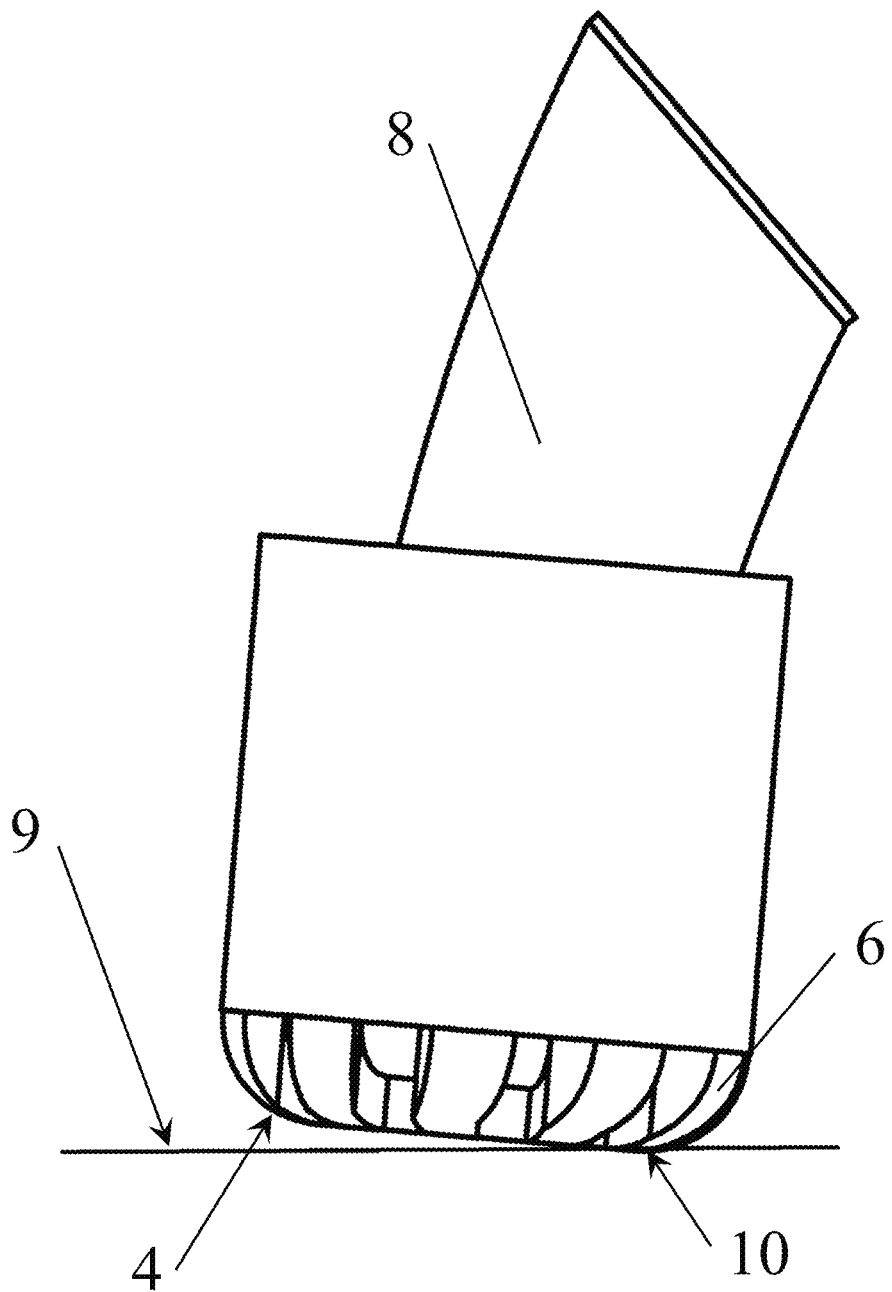
FIG. 6 is a right elevational view of a pet nail cap removably attached to a pet's nail illustrating the contact region between the pet nail cap and the contact surface.

Referring to FIGS. 1 and 2, the pet nail cap is a tubular element 1 shaped as a hollow cylinder with a circular opening 2 on the upper end 3 and a closed lower end 4. The edge formed by the cylindrical outer surface of the tubular element and its lower end is rounded by a fillet 5 that forms a rounded surface. Referring to FIG. 3, the treads 6 are positioned at an angle to the rounded surface along the tubular element circumference (the example depicted on FIG. 3 has ten treads). Referring to FIGS. 4 and 5, the spirals 7 are positioned on the internal surface of the tubular element 1 and span the full length of the tubular element (the example depicted on FIGS. 4 and 5 has three spirals). Referring now to FIG. 6, when the pet nail cap is attached to a pet's nail 8, the lower end 4 is slightly inclined to the contact surface 9. The contact 10 is established between the contact surface 9 and the treads 6, rather than the surface of the lower end 4. This leads to an increase in the coefficient of friction between the pet nail cap and the hard-surface flooring improving traction and pet's overall mobility.

The pet nail cap is constructed as a single body of a rubber-like material that provides for the pet nail cap's flexibility and durability. A preferred manufacturing method is 3D printing using flexible filaments such as thermoplastic elastomers or thermoplastic polyurethane. This manufacturing method delivers the precision needed to produce a quality product given the detailed design of the pet nail caps. Also, this manufacturing method allows to produce different sizes of the pet nail caps that range, for example, from a 3 mm to 11.5 mm internal diameter. The size could be gradually increased by 0.5 mm. These sizes correspond to most pets' nail sizes and allow for the pet nail caps to be customized for each individual pet.

A series of tests performed on different configurations of the pet nail caps with the help of a household pet—the 13-year-old basset hound—confirmed the following: When the treads were not present, the coefficient of friction was reduced between the pet nail caps and hard-surface flooring causing the pet to slip and slide. Conversely, when the treads were present and the coefficient of friction was increased, there was a visible improvement in the pet's ability to balance and gain additional traction on the hard-surface flooring. Further, the addition of the spirals to the interior surface of the pet nail caps streamlined the process of attaching and removing the pet nail caps from the pet's nails.

The invention claimed is:

1. A method for covering nails of a pet, comprising:
   attaching one or more tubular elements to one or more of the nails of the pet,
     wherein the one or more tubular elements each comprises a hollow cylinder having an outer lateral surface, an inner cylindrical surface, an upper end with a circular opening, an enclosed lower end, a rounded edge formed by the outer lateral surface and the enclosed lower end, one or more treads on the rounded edge, and one or more spirals extending from the enclosed lower end to the circular opening of the upper end on the inner cylindrical surface,
   the attaching step being practiced by twisting a respective one of the tubular elements onto a respective one of the nails of the pet.

2. A method for reducing slippage of a pet on a hard surface, comprising:
   attaching one or more tubular elements to one or more nails of the pet,
     wherein the one or more tubular elements each comprises a hollow cylinder having an outer lateral surface, an inner cylindrical surface, an upper end with a circular opening, an enclosed lower end, a rounded edge formed by the outer lateral surface and the enclosed lower end, one or more treads on the rounded edge, and one or more spirals extending from the enclosed lower end to the circular opening of the upper end on the inner cylindrical surface,
   the attaching step being practiced by twisting a respective one of the tubular elements onto a respective one of the nails of the pet.

3. A method for improving traction of a pet on a hard surface, comprising:
   attaching one or more tubular elements to one or more nails of the pet,
     wherein the one or more tubular elements each comprises a hollow cylinder having an outer lateral surface, an inner cylindrical surface, an upper end with a circular opening, an enclosed lower end, a rounded edge formed by the outer lateral surface and the enclosed lower end, one or more treads on the rounded edge, and one or more spirals extending from the enclosed lower end to the circular opening of the upper end on the inner cylindrical surface,
   the attaching step being practiced by twisting a respective one of the tubular elements onto a respective one of the nails of the pet.

\* \* \* \* \*